(12) United States Patent
Goparaju et al.

(10) Patent No.: US 8,840,719 B2
(45) Date of Patent: Sep. 23, 2014

(54) TITANIUM DIOXIDE PIGMENTS AND MANUFACTURING METHOD

(75) Inventors: Venkata Rama Rao Goparaju, Edmond, OK (US); Michael L. Ashley, Oklahoma City, OK (US)

(73) Assignee: Tronox LLC, Oklahoma City, OK (US)

( * ) Notice: Subject to any disclaimer, the term of this patent is extended or adjusted under 35 U.S.C. 154(b) by 594 days.

(21) Appl. No.: 13/044,297

(22) Filed: Mar. 9, 2011

(65) Prior Publication Data

US 2012/0232187 A1 Sep. 13, 2012

(51) Int. Cl.
*C09C 1/36* (2006.01)

(52) U.S. Cl.
CPC ........... *C09C 1/3661* (2013.01); *C01P 2006/12* (2013.01); *C01P 2006/40* (2013.01); *C01P 2006/19* (2013.01)
USPC ........................................ 106/442; 427/213.3

(58) Field of Classification Search
USPC ............................... 106/442, 436; 427/213.31
See application file for complete search history.

(56) References Cited

U.S. PATENT DOCUMENTS

| | | | |
|---|---|---|---|
| 2,885,366 A | 5/1959 | Iler | |
| 3,649,322 A | 3/1972 | Foss | |
| 3,897,261 A | 7/1975 | Allen | |
| 3,928,057 A | 12/1975 | DeColibus | |
| 4,017,328 A | 4/1977 | Higgins | |
| 4,075,031 A | 2/1978 | Allen | |
| 4,125,412 A * | 11/1978 | West | 106/446 |
| 4,199,370 A | 4/1980 | Brand | |
| 4,227,935 A | 10/1980 | Blake et al. | |
| 4,416,699 A | 11/1983 | Jacobson | |
| 5,554,216 A * | 9/1996 | Baidins et al. | 106/442 |
| 5,650,002 A | 7/1997 | Bolt | |
| 5,730,795 A | 3/1998 | Herkimer | |
| 5,886,069 A | 3/1999 | Bolt | |
| 6,342,099 B1 | 1/2002 | Hiew et al. | |
| 6,395,081 B1 | 5/2002 | Hiew et al. | |
| 2003/0089278 A1 | 5/2003 | Bettler et al. | |
| 2004/0094068 A1 | 5/2004 | Bender et al. | |

(Continued)

FOREIGN PATENT DOCUMENTS

| | | |
|---|---|---|
| CA | 1053087 A1 | 4/1979 |
| EP | 1554256 A2 | 6/2005 |

OTHER PUBLICATIONS

Iler, Ralph K., Solubility, Polymerization, Colloid and Surface Properties, and Biochemistry, The Chemistry of Silica, 1979, pp. 554-561, John Wiley & Sons, Inc., New York, NY.

Brinker, Jeffrey C. and Scherer, George W., The Physics and Chemistry of Sol-Gel Processing, Sol-Gel Science, 1990, pp. 702-716, Academic Press, Inc., San Diego, CA.

(Continued)

*Primary Examiner* — Pegah Parvini
(74) *Attorney, Agent, or Firm* — McAfee & Taft (57) ABSTRACT

The invention provides a coated inorganic oxide pigment. The inventive coated inorganic oxide pigment comprises an inorganic oxide base pigment, a porous inorganic coating formed on the base pigment, and a dense inorganic coating formed on the base pigment. The porous inorganic coating and dense inorganic coating each consist essentially of a material selected from the group consisting of silica and alumina. In another aspect, the invention provides a method of manufacturing a coated inorganic oxide pigment. In yet another aspect, the invention provides a polymer composition comprising a base polymer, and a coated inorganic oxide pigment admixed with the base polymer.

33 Claims, 5 Drawing Sheets

(56) References Cited

U.S. PATENT DOCUMENTS

| | | |
|---|---|---|
| 2004/0202601 A1 | 10/2004 | Wen et al. |
| 2005/0123761 A1 | 6/2005 | Hua et al. |
| 2006/0078485 A1 | 4/2006 | Thiele et al. |
| 2007/0137526 A1 | 6/2007 | Hager et al. |
| 2007/0295244 A1 | 12/2007 | Himmelreich et al. |
| 2008/0271642 A1 | 11/2008 | Craig et al. |
| 2010/0125117 A1 | 5/2010 | Drews-Nicolai et al. |
| 2011/0041726 A1 | 2/2011 | Robb et al. |

OTHER PUBLICATIONS

Brinker, Jeffrey C. and Scherer, George W., The Physics and Chemistry of Sol-Gel Processing, Sol-Gel Science, 1990, pp. 802-818, Academic Press, Inc., San Diego, CA.

International search report and written opinion issued Jun. 22, 2012 in corresponding PCT/US12/20823, filed Jan. 10, 2012.

Office Action issued Jun. 11, 2014 in corresponding Chinese application No. 201280012287.9, Tronox LLC.

* cited by examiner

TITANIUM DIOXIDE PIGMENTS AND MANUFACTURING METHOD

BACKGROUND OF THE INVENTION

Inorganic oxides such as titanium dioxide are used as pigments in connection with paint, paper, polymer compositions and other products. Such pigments are generally produced in powder form with specific properties and characteristics (for example, specific particle sizes, shapes and lattice structures). The pigment particles are typically coated with one or more materials to modify or enhance the properties and characteristics of the pigment for particular applications. For example, the pigment particles are often coated with compounds that function to improve the opacity, brightness, light stability, durability and light scattering properties or tint strength (hiding power) of the pigment.

An inorganic oxide that is very popular for use as a white pigment is titanium dioxide. Titanium dioxide can be manufactured by either the sulfate process or the chloride process.

In the sulfate process for manufacturing titanium dioxide, a titanium slag ore, usually an ilmenite, is dissolved in sulfuric acid to form a mixture of sulfates, including titanyl sulfate. Iron is removed from the solution. The titanyl sulfate is then hydrolyzed in solution to yield insoluble, hydrated titanium dioxide. The hydrated titanium dioxide is heated in a calciner to evaporate the water and decompose the sulfuric acid in the solid. The solid is then converted into seed crystals which can be milled to the desired size.

In the chloride process for manufacturing titanium dioxide, a dry titanium dioxide ore is fed into a chlorinator together with coke and chlorine to make a titanium halide (such as titanium tetrachloride). Streams of gaseous titanium halide (such as titanium tetrachloride) and oxygen are heated and introduced at high flow rates into an elongated vapor phase oxidation reactor conduit. A high temperature (approximately 2000° F. to 2800° F.) oxidation reaction takes place in the reactor conduit whereby particulate solid titanium dioxide and gaseous reaction products are produced. The titanium dioxide and gaseous reaction products are then cooled, and the titanium dioxide particles are recovered.

A potential problem associated with inorganic oxide pigments such as titanium dioxide pigments is the tendency of the pigment particles to flocculate or agglomerate in the base medium (i.e., the slurry of the paint, paper, polymer composition or other material in which the pigment is incorporated). Flocculation or agglomeration of the pigment particles can adversely impact desirable properties of the pigment including the opacity, brightness and light scattering efficiency of the pigment.

A related problem that can result from a high concentration of the pigment in the base medium is what is referred to as optical crowding. For example, optical crowding can occur when a high concentration of the pigment is incorporated into a polymer composition. When the concentration of the pigment in the base medium increases to a certain level, the light scattering efficiency or tint strength of the pigment can substantially decrease. The light scattering cross-section of an inorganic oxide pigment particle is significantly greater than the actual cross-section (area) of the pigment particle. At high pigment concentrations, the pigment particles are closer to one another which results in an overlap of the respective light scattering cross-sections of the particles and thereby reduces the light scattering efficiency of the dispersed pigment. In addition to the light scattering efficiency of the pigment, the optical crowding effect can also decrease the light stability, brightness and opacity of the pigment.

Various techniques have been utilized in an attempt to prevent inorganic oxide pigment particles from flocculating and agglomerating and to diminish the optical crowding effect. For example, the pigment particles have been coated with various inorganic compounds that function to modify the surface charges of the particles and impart other properties to the particles. Also, spacers, fillers and extenders have been utilized to space adjacent particles apart from one another. For example, spacer particles can be formed on the surfaces of the pigment particles in situ in an aqueous slurry containing the pigment particles. Examples of spacers, fillers and extenders that have been utilized include clay, calcium carbonate, alumina, silica and other metal oxide compounds. Metal oxide particles such as zirconia and titania can also be used, although such materials may be cost prohibitive for use on a commercial scale.

Although such techniques have been utilized with varying degrees of success, there is still room for improvement. For example, spacer particles can be difficult to disperse in the base medium and actually decrease the concentration of titanium dioxide particles that can be utilized. Also, many dry hide grade pigments that have been processed to have improved light scattering properties have relatively low bulk densities and are fluffy which makes them difficult to handle, bag and transport. For example, filling a bag or other container to capacity with a treated titanium dioxide pigment can be difficult to accomplish in an efficient manner without first deaerating the pigment. In a continuous manufacturing and packaging process, the additional time and handling required to fill the container to capacity and impart a consistent, predetermined amount of pigment to each bag can make the process inefficient.

In order to overcome the problem associated with the low bulk density of the pigment, some dry hide grade pigments are supplied in the form of slurries having high (65-75% solids concentrations). The use of slurries, however, can be problematic in some applications.

BRIEF SUMMARY OF THE INVENTION

In one aspect, the invention provides a coated inorganic oxide pigment. The inventive coated inorganic oxide pigment comprises an inorganic oxide base pigment, a porous inorganic coating formed on the base pigment, and a dense inorganic coating formed on the base pigment. The porous inorganic coating and dense inorganic coating each consist essentially of a material selected from the group consisting of silica and alumina.

In another aspect, the invention provides a method of manufacturing a coated inorganic oxide pigment. The inventive method comprises the following steps:

a) forming an aqueous slurry comprising an inorganic oxide base pigment;

b) forming at least one porous inorganic coating on the inorganic oxide base pigment particles in situ in the aqueous slurry, the porous inorganic coating consisting essentially of a material selected from the group consisting of alumina and silica; and c) forming at least one dense inorganic coating on the inorganic oxide base pigment particles in situ in the aqueous slurry, the dense inorganic coating consisting essentially of a material selected from the group consisting of alumina and silica.

The sequence of steps b) and c) of the inventive method can vary. For example, if a dense inorganic coating is formed on the base pigment particles first, step c) will be carried out prior to step b).

In yet another aspect, the invention provides a polymer composition. The polymer composition comprises a base polymer, and a coated inorganic oxide pigment admixed with the base polymer. The coated inorganic oxide pigment includes an inorganic oxide base pigment, a porous inorganic coating formed on the base pigment, and a dense inorganic coating formed on the base pigment. The porous inorganic coating and dense inorganic coating each consist essentially of a material selected from the group consisting of alumina and silica.

DETAILED DESCRIPTION OF PREFERRED EMBODIMENTS OF THE INVENTION

The invention includes a coated inorganic oxide pigment, a method of manufacturing a coated inorganic oxide pigment, and a polymer composition. In accordance with each aspect of the invention, inorganic base pigment particles are coated with at least one porous inorganic coating and at least one dense inorganic coating.

The inorganic oxide base pigment of the various aspects of the invention can be, for example, a titanium dioxide pigment. The titanium dioxide base pigment can be in any form including either of the two crystalline polymorphic forms of titanium dioxide currently produced commercially, namely the rutile form, which can be produced by either the chloride or the sulfate process for manufacturing titanium dioxide, or the anatase form, which is produced primarily by the sulfate process for manufacturing titanium dioxide. For example, the inorganic oxide base pigment used in connection with the inventive coated inorganic oxide pigment can be a rutile titanium dioxide pigment produced by the chloride process for manufacturing titanium dioxide.

The inorganic oxide base pigment of the various aspects of the invention can include additives that are imparted to the crystalline lattice. For example, aluminum chloride can be added to the reactants in the oxidation step of the chloride process for producing the titanium dioxide pigment in order to promote rutilization of the pigment. The coated inorganic oxide pigment and inorganic oxide base pigment of the various aspects of the invention are produced in the form of a powder. Thus, as used herein and in the appended claims, a "pigment" (for example, an "inorganic oxide base pigment" or a "titanium dioxide base pigment") includes a plurality of particles of the pigment.

Unless stated to the contrary, as used herein, "formed on," "deposited on" and "precipitated on" the base pigment or another material such as a particle or coating shall mean formed, deposited or precipitated (as the case may be) directly or indirectly on the base pigment or other material. For example, unless stated otherwise, at least one porous inorganic coating formed on the inorganic oxide base pigment means that the porous inorganic coating is formed directly on the inorganic oxide base pigment or on one or more coatings that are directly or indirectly formed on the inorganic oxide base pigment. As used herein and in the appended claims, "consists essentially of" means that the coating in question does not include any other compounds or components that would materially affect the basic and novel characteristics of the coating.

The porous inorganic coating(s) and the dense inorganic coating(s) formed on the inorganic oxide base pigment of the inventive coated inorganic oxide pigment and in accordance with the inventive method each consist essentially of a material selected from the group consisting of alumina and silica. As understood by those skilled in the art, the morphologies of a porous inorganic oxide coating consisting essentially of a material selected from alumina and silica and a dense inorganic oxide coating consisting essentially of a material selected from alumina and silica are significantly different. For example, as described below, the surface areas of base pigment particles coated with a porous coating consisting essentially of such a material are generally higher than the surface areas of base pigment particles coated with a dense coating consisting essentially of the same material. A porous alumina coating is formed of hydrated aluminum hydroxide. A dense alumina coating is formed of hydrous alumina. A porous silica coating is formed of hydrated amorphous silica. A dense silica coating is also formed of hydrated, amorphous silica. As described below, whether a porous or a dense coating is formed on the base pigment particles in situ in an aqueous slurry is dependent, for example, on the pH of the slurry during the precipitation process.

The inventive coated inorganic oxide pigment comprises an inorganic oxide base pigment, a porous inorganic coating formed on the base pigment, and a dense inorganic coating formed on the base pigment. As long as it includes at least one porous inorganic coating and at least one dense inorganic coating, the inventive coated inorganic oxide pigment can include additional porous and/or dense inorganic coatings as well. The sequence in which the porous and dense inorganic coatings are formed on the base pigment can vary. For example, a porous inorganic coating can be formed on the base pigment first, and then a dense inorganic coating can be formed on the base pigment on top of the porous inorganic coating. Alternatively, for example, a dense inorganic coating can be formed on the base pigment first, and then a porous inorganic coating can be formed on the base pigment on top of the dense inorganic coating. As a further example, two porous inorganic coatings and a dense inorganic coating can be formed on the base pigment, in that order. The porous inorganic coating(s) and the dense inorganic coating(s) each consist essentially of a material selected from the group consisting of alumina and silica.

The porous and dense inorganic coatings are formed on the base pigment in situ in an aqueous slurry at a temperature in the range of from about 40° C. to about 90° C. The porous and dense inorganic coatings are preferably formed on the base pigment at a temperature in the range of from about 40° C. to about 80° C.

The pH at which the porous inorganic coating is formed on the base pigment varies depending upon the nature of the porous inorganic coating. The amount in which the porous inorganic coating is formed on the base pigment also varies depending on the nature of the coating.

For example, the porous inorganic coating can consist essentially of alumina. When the porous inorganic coating consists essentially of alumina, it is formed on the base pigment at a pH in the range of from about 8 to about 11, preferably from about 8 to about 10, more preferably from about 8 to about 9. The amount in which the porous alumina coating is formed on the base pigment is preferably in the range of from about 2% to about 14% by weight, more preferably in the range of from about 2% to about 10% by weight, even more preferably in the range of from about 2% to about 6% by weight, based on the weight of the base pigment.

The porous inorganic coating can also consist essentially of silica. When the porous inorganic coating consists essentially of silica, it is formed on the base pigment at a pH in the range of from about 3 to about 7, preferably from about 3 to about 6, more preferably from about 3 to about 5. The amount in which the porous silica coating is formed on the base pigment is preferably in the range of from about 5% to about 14% by weight, more preferably from about 5% to about 10% by weight, even more preferably from about 5% to about 7% by weight, based on the weight of the base pigment.

The pH at which the dense inorganic coating is formed on the base pigment also varies depending upon the nature of the dense inorganic coating. The amount in which the dense inorganic coating is formed on the base pigment also varies depending on the nature of the coating.

For example, the dense inorganic coating can consist essentially of silica. When the dense inorganic coating consists essentially of silica, it is formed on the base pigment at a pH in the range of from about 8 to about 11, preferably from about 8 to about 10, more preferably from about 9 to about 10. The amount in which the dense silica coating is formed on the base pigment is preferably in the range of from about 5% to about 14% by weight, more preferably in the range of from about 5% to about 10% by weight, even more preferably from about 5% to about 7% by weight, based on the weight of the base pigment.

The dense inorganic coating can also consist essentially of alumina. When the dense inorganic coating consists essentially of alumina, it is formed on the base pigment at a pH in the range of from about 4 to about 7, preferably from about 5 to about 7, more preferably from about 5 to about 6. The amount in which the dense alumina coating is formed on the base pigment is preferably in the range of from about 2% to about 14% by weight, more preferably in the range of from about 3% to about 9% by weight, even more preferably from about 3% to about 6% by weight, based on of the weight of the base pigment.

As stated above, as long as the inventive coated inorganic oxide pigment includes at least one porous inorganic coating and at least one dense inorganic coating, the composition of the coatings (alumina or silica), the number of coatings and the sequence in which the coatings are formed on the base pigment and each other can vary depending on the application. For example, one porous coating and one dense coating, both consisting essentially of either silica or alumina, can be formed on the base pigment. By way of further example, a single porous coating consisting essentially of alumina and a single dense coating consisting essentially of silica, or vice versa, can be formed on the base pigment. The dense inorganic coating can be formed on top of the porous inorganic coating, and vice versa.

In one embodiment, for example, the inventive coated inorganic oxide pigment can include: (a) a porous inorganic coating that consists essentially of alumina and is formed on the base pigment at a pH in the range of from about 8 to about 11 and in an amount in the range of from about 2% to about 14% by weight, based on the weight of the base pigment; (b) a dense inorganic coating that consists essentially of silica and is formed on the base pigment at a pH in the range of from about 8 to about 11 and in an amount in the range of from about 5% to about 14% by weight, based on the weight of the base pigment; and (c) an additional porous inorganic coating that consists essentially of silica and is formed on the base pigment at a pH in the range of from about 3 to about 7 and in an amount in the range of from about 5% to about 14% by weight, based on the weight of the base pigment. The porous silica coating is formed directly on the base pigment, the dense silica coating is formed on the base pigment on top of the porous silica coating, and the porous alumina coating is formed on the base pigment on top of the dense silica coating.

In another embodiment, for example, the inventive coated inorganic oxide pigment can include: (a) a porous inorganic coating that consists essentially of silica and is formed on the base pigment at a pH in the range of from about 3 to about 7 and in an amount in the range of from about 5% to about 14% by weight, based on the weight of the base pigment; (b) a dense inorganic coating that consists essentially of alumina and is formed on the base pigment at a pH in the range of from about 4 to about 7 and in an amount in the range of from about 2% to about 14% by weight, based on the weight of the base pigment; and (c) an additional porous inorganic coating that consists essentially of alumina and is formed on the base pigment at a pH in the range of from about 8 to about 11 and in an amount in the range of from about 2% to about 14% by weight, based on the weight of the base pigment. The porous alumina coating is formed directly on the base pigment, the porous silica coating is formed on the base pigment on top of the porous alumina coating, and the dense alumina coating is formed on the base pigment on top of the porous silica coating.

In yet another embodiment, for example, the inventive coated inorganic oxide pigment can include: (a) a porous inorganic coating that consists essentially of silica and is formed on the base pigment at a pH in the range of from about 3 to about 7 and in an amount in the range of from about 5% to about 14% by weight, based on the weight of the base pigment; (b) a dense inorganic coating that consists essentially of alumina and is formed on the base pigment at a pH in the range of from about 4 to about 7 and in an amount in the range of from about 2% to about 14% by weight, based on the weight of the base pigment; (c) an additional porous inorganic coating that consists essentially of alumina and is formed on the base pigment at a pH in the range of from about 8 to about 11 and in an amount in the range of from about 2% to about 14% by weight, based on the weight of the base pigment; (d) an additional dense inorganic coating that consists essentially of alumina and is formed on the base pigment at a pH in the range of from about 4 to about 7 and in an amount in the range of from about 2% to about 14% by weight, based on the weight of the base pigment; and (e) an additional dense inorganic coating that consists essentially of silica and is formed on the base pigment at a pH in the range of from about 8 to about 11 and in an amount in the range of from about 5% to about 14% by weight, based on the weight of the base pigment. One of the dense alumina coatings is formed directly on the base pigment, the porous silica coating is formed on the base pigment on top of the dense alumina coating, the other of the dense alumina coatings is formed on the base pigment on top of the porous silica coating, the dense silica coating is formed on the base pigment on top of the dense alumina coating, and the porous alumina coating is formed on the base pigment on top of the dense silica coating.

The total amount of the porous and dense coatings formed on the base pigment of the inventive coated inorganic oxide pigment is preferably no greater than about 26% by weight, based on the weight of the base pigment. More preferably, the total amount of the porous and dense coatings formed on the base pigment of the inventive coated inorganic oxide pigment is in the range of from about 15% by weight to about 18% by weight, based on the weight of the base pigment.

The inventive coated inorganic oxide pigment has a good light scattering efficiency and tint strength (hiding power), even when used at high concentrations, and also has a relatively high bulk density and good processing characteristics.

The inventive pigment can be supplied to customers in both dry and slurry forms. The use of at least one porous inorganic coating together with at least one dense inorganic coating results in a pigment that has good optical properties and is also relatively easy to process. For example, the porous coating(s) increase the optical properties including the hiding power of the base pigment. The dense coating(s) increase the processability of the coated pigment and control pigment properties such as oil adsorption, surface area and bulk density which can be negatively affected by high levels of porous metal oxide coatings on the base pigment. For example, the inventive pigment makes a good dry hide grade quality pigment with good optical properties such as tint strength and improved processability. By way of further example, due to its light scattering efficiency and high refractive index, the inventive pigment is very suitable for use in high concentrations in polymers to serve as whiteners, tinting agents or opacifiers therein.

The inventive method of manufacturing a coated inorganic oxide pigment comprises the following steps:
 a) forming an aqueous slurry comprising an inorganic oxide base pigment;
 b) forming at least one porous inorganic coating on the inorganic oxide base pigment particles in situ in the aqueous slurry, the porous inorganic coating consisting essentially of a material selected from the group consisting of alumina and silica; and
 d) forming at least one dense inorganic coating on the inorganic oxide base pigment particles in situ in the aqueous slurry, the dense inorganic coating consisting essentially of a material selected from the group consisting of alumina and silica.

The aqueous slurry is formed in accordance with step a) above by mixing the desired amount of the base inorganic oxide pigment with water. For example, an amount of water sufficient to achieve a slurry density of about 1.35 grams per milliliter can be utilized. Aqueous slurries of rutile titanium dioxide that are used in the inventive method will typically have titanium dioxide solid concentrations of less than about 45% by weight, preferably less than about 35% by weight, based on the total weight of the slurry.

Prior to forming any coatings on the base pigment, the aqueous slurry is preferably milled to cause at least about 50% of the base pigment particles in the slurry to have a particle size of less than 0.7 microns. The aqueous slurry is preferably milled to cause at least about 50%, more preferably at least about 70%, of the base pigment particles in the slurry to have a particle size of less than 0.5 microns. Milling the slurry generally causes the tint strength of the resulting coated pigment to be lower.

The aqueous slurry can be milled by various methods, including cage milling, bead milling and jet milling as well as other techniques known to those skilled in the art. The aqueous slurry is preferably milled by sand milling the slurry.

Prior to forming an inorganic coating on the base inorganic oxide particles, the temperature of the aqueous slurry is heated to a temperature in the range of from about 40° C. to about 90° C., preferably in the range of from about 40° C. to about 80° C. The temperature of the aqueous slurry is preferably increased to the desired level as the inorganic oxide base pigment is mixed with water to form the slurry and then maintained at a constant level throughout the coating process.

The pH of the aqueous slurry is preferably initially adjusted to a level in the range of from about 1.0 to about 3.0, preferably about 1.5, and the slurry is allowed to digest for a period of time sufficient to create anchoring sites on the surfaces of the base pigment particles to assist in the formation of anchoring sites therein. Typically, the slurry is allowed to digest at this stage for about 15 minutes. Without the digestion step, the surfaces of the pigment particles may not accept all of the inorganic oxide that is precipitated which can result in a lower tint strength.

The pH of the aqueous slurry can be lowered in the inventive method as necessary, for example, with sulfuric acid. The pH of the aqueous slurry can be increased in the inventive method as necessary, for example, with sodium hydroxide.

Various inorganic coating precursors are added to the aqueous slurry to form the porous and dense inorganic coatings on the base pigment particles. The nature of the inorganic coating precursors depends on the composition of the coating to be formed. For example, if a porous or dense alumina coating is to be formed, the inorganic coating precursors utilized can be sodium aluminate, aluminum hydroxide and aluminum sulfate. Sodium aluminate is preferred. If a porous or dense silica coating is to be formed, the precursors utilized can be sodium silicate, potassium silicate and silicic acid. Sodium silicate is preferred.

A porous inorganic coating is formed on the base pigment particles by adjusting the pH of the aqueous slurry to a level sufficient to cause the porous inorganic coating to precipitate on the base pigment particles and adding necessary precursors of the porous inorganic coating to the aqueous slurry. Preferably, the pH of the aqueous slurry is adjusted to the desired level, and the slurry is allowed to digest before adding the porous inorganic coating precursors thereto. The aqueous slurry is allowed to digest for a period of time sufficient to allow anchoring sites to be formed on the surfaces of the base pigment particles for receiving at least one porous inorganic coating thereon. Typically, the slurry is allowed to digest at this stage for about 15 minutes. Without the digestion step, the surfaces of the pigment particles may not accept all of the inorganic oxide that is precipitated which can result in a decreased tint strength.

The pH utilized to cause the porous inorganic coating to precipitate on the base pigment particles depends on the composition of the coating to be formed (alumina or silica). The amount of precursors utilized to form the porous inorganic coating also depends on the composition of the coating to be formed.

For example, a porous coating consisting essentially of alumina can be formed on the base pigment particles. When the porous coating is to consist essentially of alumina, the porous alumina coating is formed on the base pigment particles at a pH in the range of from about 8 to about 11, preferably from about 8 to about 10 and even more preferably from about 8 to about 9. A sufficient amount of alumina precursors are added to cause the porous alumina coating to be formed on the base pigment particles in an amount in the range of from about 2% to about 14% by weight, preferably from about 2% to about 10% by weight, more preferably about 2% to about 6% by weight, based on the weight of the base pigment.

For example, a porous coating consisting essentially of silica can also be formed on the base pigment particles. When the porous coating is to consist essentially of silica, the porous silica coating is formed on the base pigment particles at a pH in the range of from about 3 to about 7, preferably from about 3 to about 6 and even more preferably from about 3 to about 5. A sufficient amount of silica precursors are added cause the porous silica coating to be formed on the base pigment particles in an amount in the range of from about 5% to about 14% by weight, preferably from about 5% to about 10% by weight, more preferably from about 5% to about 7% by weight, based on the weight of the base pigment.

Once the desired porous inorganic coating precursors are added to the aqueous slurry, the porous inorganic coating precipitates on the base pigment particles. The pH of the aqueous slurry is maintained at the desired level throughout the coating process.

A dense inorganic coating is formed on the base pigment particles by adjusting the pH of the aqueous slurry to a level sufficient to cause the dense inorganic coating to precipitate on the base pigment particles and adding necessary precursors of the dense inorganic coating to the aqueous slurry. Preferably, the pH of the aqueous slurry is adjusted to the desired level, and the slurry is allowed to digest before adding the dense inorganic coating precursors thereto. The aqueous slurry is allowed to digest for a period of time sufficient to allow anchoring sites to be formed on the surfaces of the base pigment particles for receiving at least one dense inorganic coating thereon. Typically, the slurry is allowed to digest at this stage for about 15 minutes. Without this step, the surfaces of the pigment particles may not accept all of the inorganic oxide that is precipitated which can result in a decreased tint strength.

The pH utilized to cause the dense inorganic coating to precipitate on the base pigment particles depends on the composition of the coating to be formed. The amount of precursors utilized to form the dense inorganic coating also depends on the composition of the coating to be formed.

For example, a dense coating consisting essentially of silica can be formed on the base pigment particles. When the dense coating is to consist essentially of silica, the silica coating is formed on the base pigment particles at a pH in the range of from about 8 to about 11, preferably from about 8 to about 10 and even more preferably from about 9 to about 10. A sufficient amount of silica precursors are added cause the dense silica coating to be formed on the base pigment particles in an amount in the range of from about 5% to about 14% by weight, preferably from about 5% to about 10% by weight, more preferably about 5% to about 7% by weight, based on the weight of the base pigment.

For example, a dense coating consisting essentially of alumina can also be formed on the base pigment particles. When the dense coating is to consist essentially of alumina, the dense alumina coating is formed on the base pigment particles at a pH in the range of from about 4 to about 7, preferably from about 5 to about 7 and even more preferably from about 5 to about 6. A sufficient amount of alumina precursors are added cause the dense alumina coating to be formed on the base pigment particles in an amount in the range of from about 2% to about 14% by weight, preferably from about 3% to about 9% by weight, more preferably from about 3% to about 6% by weight, based on the weight of the base pigment.

Once the desired dense inorganic coating precursors are added to the aqueous slurry, the dense inorganic coating precipitates on the base pigment particles. The pH of the aqueous slurry is maintained at the desired level throughout the coating process.

Once the desired porous and dense inorganic coatings are formed on the base pigment particles, the pH of the slurry is adjusted, as necessary, to a pH in the range of from about 4.5 to about 6.0, and the slurry is allowed to digest for a period of time sufficient to allow the pH of the solution to stabilize and to help the coatings cure and stabilize. The slurry is typically allowed to digest at this stage for about 15 minutes.

The aqueous slurry is then filtered to remove the coated pigment therefrom, and the coated pigment is washed to remove soluble salts therefrom. For example, the slurry can be filtered by vacuum filtration using a Buchner funnel. The coated pigment can be washed by using a vacuum to pull deionized water through the pigment filter cake.

The resulting filter cake is then dried and micronized to yield a coated inorganic oxide pigment in accordance with the invention.

As long as at least one porous inorganic coating and at least one dense inorganic coating are formed on the base pigment particles, the number of porous and dense inorganic coatings as well as the compositions of the coatings (alumina or silica) that are formed on the base pigment particles, and the sequence in which the coatings are formed on the base pigment particles in accordance with the inventive method can vary. For example, one porous coating and one dense coating, both consisting essentially of either silica or alumina, can be deposited on the base pigment. By way of further example, a single porous coating consisting essentially of alumina and a single dense coating consisting essentially of silica, or vice versa, can be deposited on the base pigment. The dense inorganic coating can be deposited on top of the porous inorganic coating, and vice versa.

For example, in one embodiment, a porous inorganic coating consisting essentially of silica is formed directly on the base pigment at a pH in the range of from about 3 to about 7 and in an amount in the range of from about 5% to about 14% by weight, based on the weight of the base pigment. A dense inorganic coating consisting essentially of silica is formed on the base pigment on top of the porous silica coating at a pH in the range of from about 8 to about 11 and in an amount in the range of from about 5% to about 14% by weight, based on the weight of the base pigment. A porous inorganic coating consisting essentially of alumina is formed on the base pigment on top of the dense silica coating at a pH in the range of from about 8 to about 11 and in an amount in the range of from about 2% to about 14% by weight, based on the weight of the base pigment.

In another embodiment, for example, a porous inorganic coating consisting essentially of alumina is formed directly on the base pigment at a pH in the range of from about 8 to about 11 and in an amount in the range of from about 2% to about 14% by weight, based on the weight of the base pigment. A porous inorganic coating consisting essentially of silica is formed on the base pigment on top of the porous alumina coating at a pH in the range of from about 3 to about 7 and in an amount in the range of from about 5% to about 14% by weight, based on the weight of the base pigment. A dense inorganic coating consisting essentially of alumina is formed on the base pigment on top of the porous silica coating at a pH in the range of from about 4 to about 7 and in an amount in the range of from about 2% to about 14% by weight, based on the weight of the base pigment.

In yet another embodiment of the inventive method, for example, a dense inorganic coating consisting essentially of alumina is formed directly on the base pigment at a pH in the range of from about 4 to about 7 and in an amount in the range of from about 2% to about 14% by weight, based on the weight of the base pigment. A porous inorganic coating consisting essentially of silica is formed on the base pigment on top of the dense alumina coating at a pH in the range of from about 3 to about 7 and in an amount in the range of from about 5% to about 14% by weight, based on the weight of the base pigment. A dense inorganic coating consisting essentially of alumina is formed on the base pigment on top of the porous silica coating at a pH in the range of from about 4 to about 7 and in an amount in the range of from about 2% to about 14% by weight, based on the weight of the base pigment. A dense inorganic coating consisting essentially of silica is formed on the base pigment on top of the second dense alumina coating at a pH in the range of from about 8 to about 11 and in an amount in the range of from about 5% to about 14% by weight, based on the weight of the base pigment. A porous inorganic coating consisting essentially of alumina is formed on the base pigment on top of the dense silica coating at a pH in the range of from about 8 to about 11 and in an amount in the range of from about 2% to about 14% by weight, based on the weight of the base pigment.

The porous inorganic coating and the dense inorganic coating preferably comprise no greater than about 26% by weight based on the weight of the base pigment. More preferably, the porous inorganic coating and the dense inorganic coating comprise in the range of from about 15% by weight to about 18% by weight, based on the weight of the base pigment.

The coated inorganic oxide pigment formed in accordance with the inventive method has a good light scattering efficiency and tint strength (hiding power), even when used at high concentrations, and also has a relatively high bulk density and good processing characteristics. The coated inorganic oxide pigment formed in accordance with the inventive method can be supplied to customers in both dry and slurry forms. The use of at least one porous inorganic coating together with at least one dense inorganic coating results in a pigment that has good optical properties and is also relatively easy to process. For example, the porous coating(s) increase the optical properties including the hiding power of the base pigment. The dense coating(s) increase the processability of the coated pigment and control pigment properties such as oil adsorption, surface area and bulk density which can be negatively affected by high levels of porous metal oxide coatings on the base pigment. For example, the coated inorganic oxide pigment formed in accordance with the inventive method makes a good dry hide grade quality pigment with both good optical properties such as tint strength and improved processability. By way of further example, due to its light scattering efficiency and high refractive index, the coated inorganic oxide pigment formed in accordance with the inventive method is very suitable for use in high concentrations in polymers to serve as whiteners, tinting agents or opacifiers therein. The inventive coated inorganic oxide pigment can be manufactured in accordance with the inventive method.

As stated above, the surface areas of coated inorganic oxide pigment particles coated with a porous coating in accordance with the invention are generally higher than the surface areas of coated inorganic oxide pigment particles coated with a dense coating formed of the same material. The specific surface area values depend on the amount of the coating as well as the composition of the coating (whether it is porous or dense). Generally, the more inorganic material (alumina, silica or a mixture thereof) utilized, the higher the surface area of the coated pigment particles. Due to the microporous nature of silica coatings, base pigment particles coated with silica (whether a porous silica coating or a dense silica coating) will have significantly higher surface area values than the surface area values of base pigment particles coated with corresponding amounts of alumina. Examples are set forth in the following table:

TABLE 1

| Surface Area Values | | | | |
|---|---|---|---|---|
| Base Pigment | Coating | Nature | Amount (Weight %)[1] | BET Surface Area (m$^2$/g)[2] |
| Titanium Dioxide[3] | none | N/A | — | 8 |

TABLE 1-continued

| Surface Area Values | | | | |
|---|---|---|---|---|
| Base Pigment | Coating | Nature | Amount (Weight %)[1] | BET Surface Area (m$^2$/g)[2] |
| Titanium Dioxide[3] | Alumina | Dense | 3 | 11 |
| Titanium Dioxide[3] | Alumina | Dense | 15 | 16 |
| Titanium Dioxide[3] | Alumina | Porous | 3 | 18 |
| Titanium Dioxide[3] | Alumina | Porous | 15 | 52 |
| Titanium Dioxide[3] | Silica | Dense | 3 | 11 |
| Titanium Dioxide[3] | Silica | Dense | 15 | 50 |
| Titanium Dioxide[3] | Silica | Porous | 3 | 15 |
| Titanium Dioxide[3] | Silica | Porous | 15 | 91 |

[1] The percent by weight of the coating based on the weight of the corresponding base pigment.
[2] The square meters per gram of the pigment particles.
[3] Rutile titanium dioxide prepared by the chloride process.

The BET surface area was determined in accordance with ASTM D4567-03(2008).

Referring now to FIGS. 1-5, various examples of the inventive coated inorganic oxide pigment and coated inorganic oxide pigments formed in accordance with the inventive method are illustrated. In all of the examples, the illustrated porous and dense inorganic coatings are formed of alumina, silica or a mixture thereof.

Figure 1:
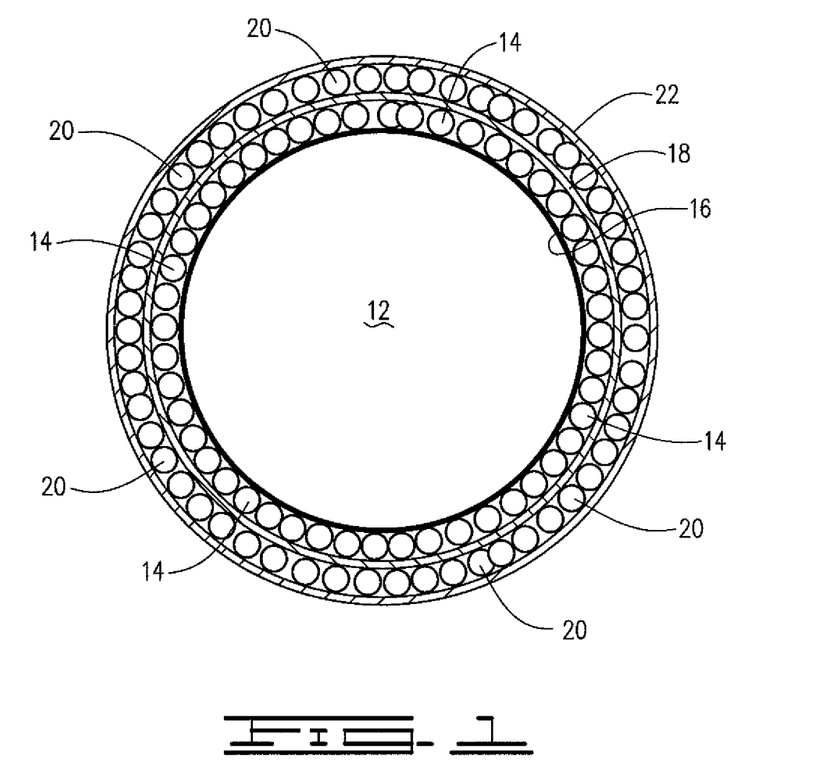
FIGS. 1-5 illustrate examples of the inventive coated inorganic oxide pigment having various porous and dense coatings formed thereon.

FIG. 1 illustrates an inorganic oxide base pigment particle 12 having a porous inorganic coating 14 deposited on the outer surface 16 of the base pigment particle. A dense inorganic coating 18 is deposited on the base pigment particle 12 on top of the porous inorganic coating 14. A porous inorganic coating 20 is deposited on the base pigment particle 12 on top of the dense inorganic coating 18. Finally, a dense inorganic coating 22 is deposited on the base pigment particle 12 on top of the porous inorganic coating 20.

Figure 2:
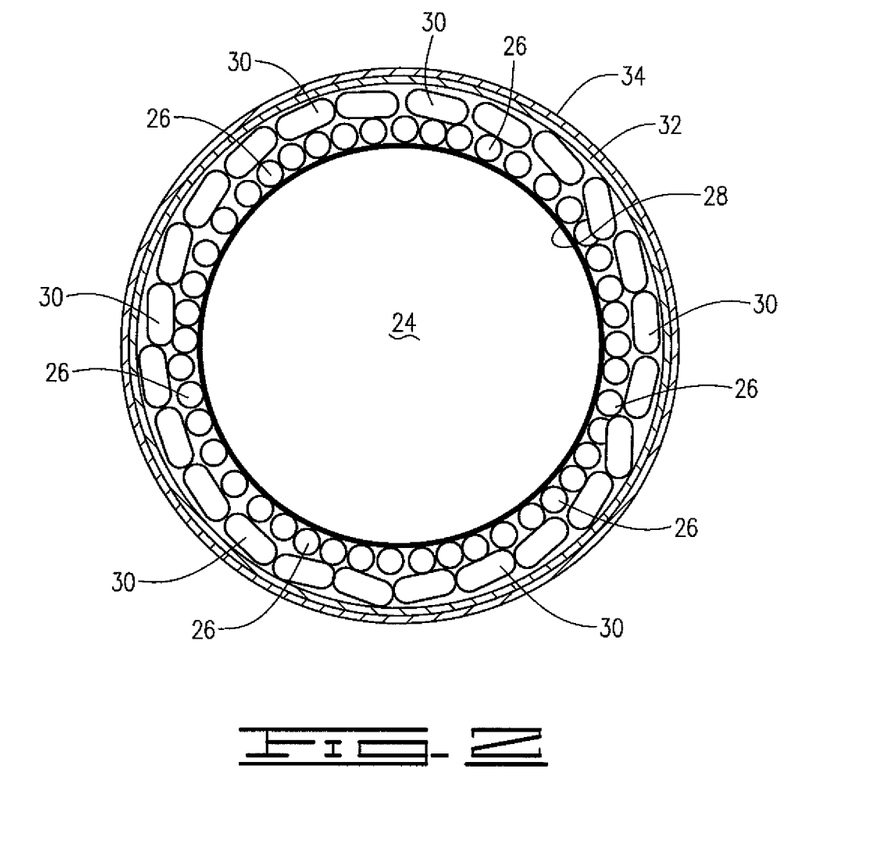

FIG. 2 illustrates an inorganic oxide base pigment particle 24 having a porous inorganic coating 26 deposited on the outer surface 28 of the base pigment particle. A second porous inorganic coating 30 is deposited on the base pigment particle 24 on top of the first porous inorganic coating 26. A dense coating 32 is deposited on the base pigment particle 24 on top of the porous inorganic coating 30. Finally, a dense inorganic coating 34 is deposited on the base pigment particle 24 on top of the dense inorganic coating 32.

Figure 3:
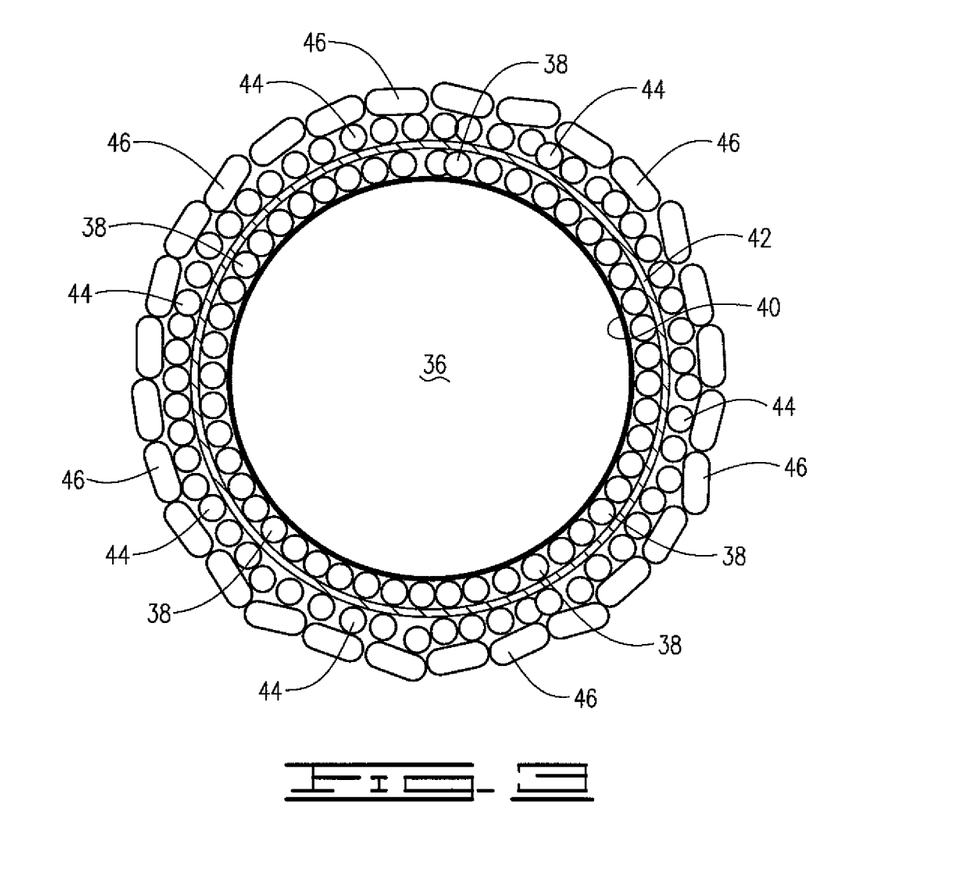

FIG. 3 illustrates an inorganic oxide base pigment particle 36 having a porous inorganic coating 38 deposited on the outer surface 40 of the base pigment particle. A dense inorganic coating 42 is deposited on the base pigment particle 36 on top of the porous inorganic coating 38. A porous inorganic coating 44 is deposited on the base pigment particle 36 on top of the dense inorganic coating 42. Finally, a porous inorganic coating 46 is deposited on the base pigment particle 36 on top of the porous inorganic coating 44.

Figure 4:
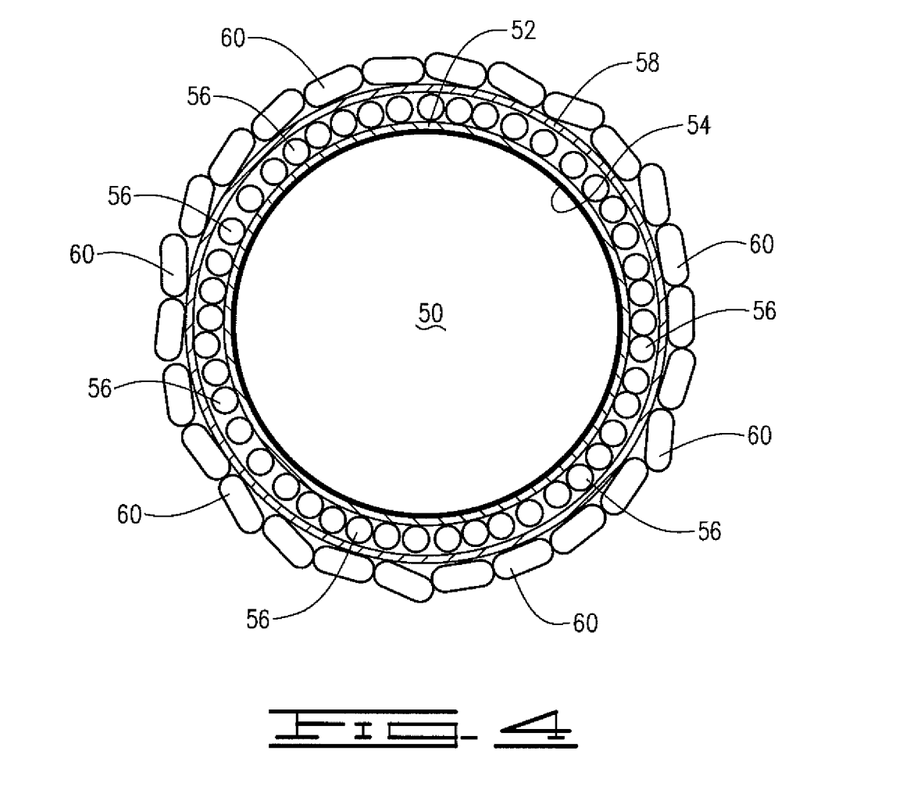

FIG. 4 illustrates an inorganic oxide base pigment particle 50 having a dense inorganic coating 52 deposited on an outer surface 54 of the base pigment particle. A porous inorganic coating 56 is deposited on the base pigment particle 50 on top of the dense inorganic coating 52. A dense inorganic coating 58 is deposited on the base pigment particle 50 on top of the porous inorganic coating 56. Finally, a porous inorganic coating 60 is deposited on the base pigment particle 50 on top of the dense inorganic coating 58.

Figure 5:
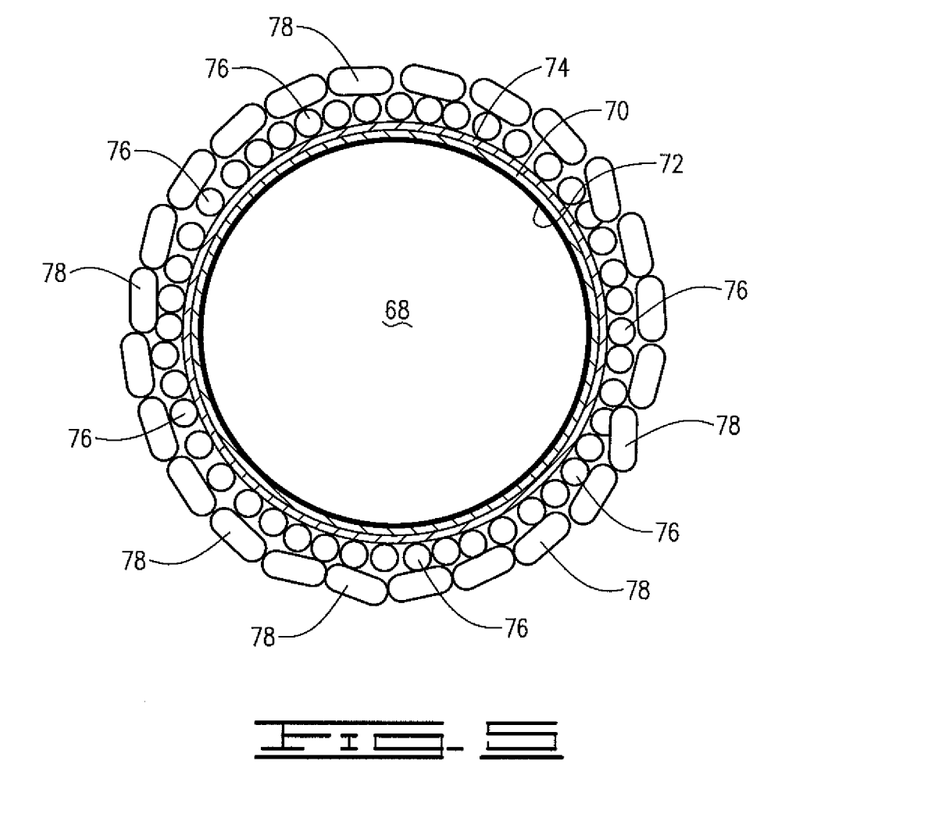

FIG. 5 illustrates an inorganic oxide base pigment particle 68 having a dense inorganic coating 70 deposited on the outer surface 72 of the base pigment particle. A second dense inorganic coating 74 is deposited on the base pigment particle 68 on top of the first dense inorganic coating 70. A porous inorganic coating 76 is deposited on the base pigment particle 68 on top of the dense inorganic coating 74. Finally, a second porous inorganic coating 78 is deposited on the base pigment particle 68 on top of the first porous inorganic coating 76.

The inventive polymer composition comprises a base polymer, and a coated inorganic oxide pigment admixed with the base polymer.

For example, the base polymer can be a latex polymer. Additional components such as extenders, dispersants and rheology modifiers can also be included in the inventive polymer composition depending on the particular application.

The coated inorganic oxide pigment is the inventive coated inorganic oxide pigment as described above, and can be formed in accordance with the inventive method, as described above.

The coated inorganic oxide pigment is present in the polymer composition in an amount of at least about 12% by weight based on the total weight of the polymer composition. More preferably, the coated inorganic oxide pigment is present in the polymer composition in an amount in the range of from about 12% to about 75% by weight based on the total weight of the polymer composition.

EXAMPLES

The present invention is exemplified by the following examples, which are given by way of example only and should not be taken as limiting of the present invention in any way.

In each of the following examples, the titanium dioxide base pigment utilized was a rutile titanium dioxide manufactured by Tronox LLC in accordance with the chloride process. The sodium silicate utilized as a precursor for forming porous and dense silica coatings on the base pigment particles was sodium silicate that had a density of 1.25 g/cc and a ratio of sodium monoxide to silicon dioxide of 0.31. The sodium aluminate precursor used for forming porous and dense alumina coatings on the base pigment particles was sodium aluminate having a density of 1.31 g/cc and a ratio of sodium monoxide to aluminum oxide of 0.97. Unless stated otherwise, the pH of the aqueous slurry was adjusted up by using a 5 normal sodium hydroxide solution. Unless stated otherwise, the pH of the aqueous solution was adjusted down by using a 95% by weight sulfuric acid solution.

The following test methods were utilized to evaluate the inventive coated titanium dioxide pigments produced in accordance with in the examples.

Specific Resistance

The specific resistance (in ohm-cm) was measured using a method in accordance with ASTM E-2448, except that in this case the specific resistance was measured without filtering the solution to remove the pigment therefrom. The pH was measured in the same solution in accordance with ASTM E70-07M except that the pH probe used was a gel filled probe with an epoxy body.

Tint Strength and Tint Tone

The tint strength and tint tone were measured with a latex emulsion formulation that was tinted with carbon black and included 60% by volume, based on the volume of the emulsion, of the inventive coated titanium dioxide pigment being tested. Such a volume of the inventive coated titanium dioxide pigment in the paint was above the critical pigment volume concentration for such a system. A sample and a standard pigment were prepared in identical formulations. Both paints were then drawn down side by side on a Leneta card. The CIE-L* and b* values of the dried paint were measured using an integrating spear spectrophotometer, and these values were used to calculate the tint strength and tint tone.

The tint strength was calculated using the Kubelka Munk Equation where:

$$\text{Tint Strength} = \frac{\left(\frac{K}{S}\right)_{Standard}}{\left(\frac{K}{S}\right)_{Sample}} \times AssignedValue$$

wherein: K=Absorbance of carbon black pigment
S=Scatter of titanium dioxide pigment
Tint tone was calculated as follows:

$$\text{Tint Tone} = b^*_{Sample} - b^*_{Standard} + AssignedValue.$$

Ink Stain

The ink stain was measured using an untinted drawdown of the same paint used in the tint strength test described above. The CIE-L* of the dried film was measured using an integrating sphere spectrophotometer. A 1.0 milliliter drawdown of ink was applied to the paint film and allowed to penetrate for 2 minutes. The ink was then removed by vigorous rubbing with a naphtha based solvent and the CIE-L* value again read.

The ink stain value was then calculated as follows:

$$\text{InkStain} = L^*_{beforeInk} - L^*_{afterInk}.$$

Oil Absorption

The oil absorption of the inventive coated titanium dioxide pigment being tested was measured using a spatula rub-out method similar to ASTM D281-95. The only deviation from the ASTM D281-95 method was the use of 5 grams of pigment in both the test and the calculations so that the result is still reported as grams of oil required to wet 100 grams of pigment.

BET Surface Area

The BET surface area of the coated inorganic oxide pigment was measured in accordance with ASTM D4567-03 (2008).

Example 1

A coated inorganic oxide pigment comprising a titanium dioxide base pigment, a porous silica coating deposited on the base pigment, a dense silica coating deposited on the base pigment on top of the porous silica coating, and a porous alumina coating deposited on the base pigment on top of the dense silica coating was prepared in accordance with the inventive method.

An aqueous slurry comprising the titanium dioxide base pigment was prepared by mixing 800 g of the titanium dioxide base pigment with 2100 ml of water. The aqueous slurry was then milled sufficiently to cause 70% of the base titanium dioxide particles in the slurry to have a particle size of less than 0.5 μm. The slurry was then heated to 70° C.

The pH of the slurry was adjusted to 1.5 and the slurry was allowed to digest for 15 minutes in order to create anchoring sites on the pigment particles to assist in the formation of the inorganic coatings thereon.

The pH was then increased to 4.5 and maintained at this level. After the aqueous slurry was allowed to digest for 15 minutes, 200 ml of sodium silicate were added to the aqueous slurry which caused a coating of porous silica particles to precipitate on the base pigment particles.

Thereafter, the pH of the aqueous slurry was increased to 11. While maintaining the pH of the slurry at a value of 11, 200 ml of additional sodium silicate were added to the slurry to form a dense silica coating on the titanium dioxide base pigment particles on top of the porous silica coating thereon.

Next, while continuing to maintain the pH of the aqueous slurry at a value of 11, 90 ml of sodium aluminate were added to the aqueous slurry to form a porous alumina coating on the titanium dioxide base pigment on top of the dense silica coating that was formed thereon. The additional sodium silicate and the sodium aluminate were added to the aqueous slurry over a period of 15 minutes.

Thereafter, the pH of the slurry was adjusted to less than 5 and the slurry was allowed to digest for an additional 15 minutes in order to allow the pH of the slurry to stabilize and to help the coatings cure and stabilize. The slurry was then filtered to remove the coated pigment therefrom, and the coated pigment was washed to remove soluble salts therefrom. The resulting filter cake was dried and micronized to yield a coated inorganic oxide pigment in accordance with the present invention.

The properties of the coated pigment, as determined in accordance with the methods described above, are set forth below:

TABLE 2

Titanium Dioxide Base Pigment Including Porous Silica, Dense Silica and Porous Alumina Coatings

| pH | Specific Resistance | Tint Strength | Tint Tone | Ink Stain | Oil Absorption | BET Surface Area (m²/g) |
|---|---|---|---|---|---|---|
| 9.0 | 9,990 | 119 | −3.74 | −8.3 | 46 | 36 |

Thus, the inventive coated inorganic oxide pigment formed in accordance with the inventive method had good optical properties (including tint strength) and a nice ink stain value. The results show that the precipitation of a dense coating on the pigment particles helps control the surface area of the particles. The lower surface area of the particles is reflective of a higher bulk density thereof.

Example 2

A coated inorganic oxide pigment comprising a titanium dioxide base pigment, a porous silica coating deposited on the base pigment, a dense alumina coating deposited on the base pigment on top of the porous silica coating, a dense silica coating deposited on the base pigment on top of the dense alumina coating, and a porous alumina coating deposited on the base pigment on top of the dense silica coating was prepared in accordance with the inventive method.

An aqueous slurry comprising the titanium dioxide base pigment was prepared by mixing 800 g of the titanium dioxide base pigment with 2100 ml of water. The aqueous slurry was then milled sufficiently to cause 70% of the base titanium dioxide particles in the slurry to have a particle size of less than 0.5 μm. The slurry was then heated to 70° C.

The pH of the slurry was adjusted to 1.5 and the slurry was allowed to digest for 15 minutes in order to create anchoring sites on the pigment particles to assist in the formation of the inorganic coatings thereon.

The pH was then increased to 4.5 and maintained at this level. Thereafter, 12 ml of sodium aluminate and 210 ml of sodium silicate, respectively, were added to the aqueous slurry which caused a coating of porous silica particles to precipitate on the base pigment particles.

Thereafter, the pH of the aqueous slurry was increased to 6 to 7. While maintaining the pH of the slurry at a value of 6 to 7, 75 ml of sodium aluminate were added to the slurry to form a dense alumina coating on the base pigment particles on top of the porous silica coating formed thereon.

Next, the pH of the aqueous slurry was adjusted to 9-10. While maintaining the pH at a level of 9 to 10, 200 ml of additional sodium silicate were added to the slurry to form a dense silica coating on the base pigment particles on top of the dense alumina coating formed thereon.

Next, while continuing to maintain the pH of the aqueous slurry at a value of 9 to 10, 50 ml of sodium aluminate were added to the aqueous slurry to form a porous alumina coating on the titanium dioxide base pigment on top of the dense silica coating that was formed thereon.

Thereafter, the pH of the slurry was adjusted to less than 5 and the slurry was allowed to digest for an additional 15 minutes in order to allow the pH of the slurry to stabilize and to help the coatings cure and stabilize. The slurry was then filtered to remove the coated pigment therefrom, and the coated pigment was washed to remove soluble salts therefrom. The resulting filter cake was dried and micronized to yield a coated inorganic oxide pigment in accordance with the present invention.

The properties of the coated pigment, as determined in accordance with the methods described above, are set forth below:

TABLE 3

Titanium Dioxide Base Pigment Including Porous Silica, Dense Alumina, Dense Silica and Porous Alumina Coatings

| pH | Specific Resistance | Tint Strength | Tint Tone | Ink Stain | Oil Absorption | BET Surface Area (m²/g) |
|---|---|---|---|---|---|---|
| 8.0 | 6,460 | 116 | −4.1 | −9.9 | 40 | 52 |

Thus, the inventive coated inorganic oxide pigment formed in accordance with the inventive method had good optical properties (including tint strength) and tint tone. The results also show that a dense silica coating is also formed on the base pigment particles at a pH of 9, and that oil absorption remains relatively low as a result of the coating. The results show that the precipitation of a dense coating on the pigment particles helps control the surface area of the particles. The lower surface area of the particles is reflective of a higher bulk density thereof.

Example 3

A coated inorganic oxide pigment comprising a titanium dioxide base pigment, a porous silica coating deposited on the base pigment, a dense silica coating deposited on the base pigment on top of the porous silica coating, and a porous alumina coating deposited on the base pigment on top of the dense silica coating was prepared in accordance with the inventive method.

An aqueous slurry comprising the titanium dioxide base pigment was prepared by mixing 800 g of the titanium dioxide base pigment with 2100 ml of water. The aqueous slurry was then milled sufficiently to cause 70% of the base titanium dioxide particles in the slurry to have a particle size of less than 0.5 μm. The slurry was then heated to 70° C.

The pH of the slurry was adjusted to 1.5 and the slurry was allowed to digest for 15 minutes in order to create anchoring sites on the pigment particles to assist in the formation of the inorganic coatings thereon.

The pH of the aqueous slurry was then increased to 4.5 and maintained at this level. After the aqueous slurry was allowed to digest for 15 minutes, 200 ml of sodium silicate were added to the aqueous slurry which caused a coating of porous silica particles to precipitate on the base pigment particles.

Thereafter, 45 ml of sodium aluminate were added to the aqueous slurry to increase the pH of the aqueous slurry to 10. While maintaining the pH of the slurry at a value of 10, 200 ml of sodium silicate were added to the aqueous slurry which caused a coating of dense silica particles to precipitate on the base pigment particles on top of the porous silica particles precipitated thereon.

Next, while maintaining the pH of the slurry at a value of 10, an additional 45 ml of sodium aluminate were added to the aqueous slurry to form a porous alumina coating on the titanium dioxide base pigment on top of the dense silica coating that was formed thereon. The additional sodium silicate and additional sodium aluminate were added to the aqueous slurry over a period of 10 minutes.

Thereafter, the pH of the slurry was adjusted to less than 5 and the slurry was allowed to digest for an additional 15 minutes in order to allow the pH of the slurry to stabilize. The slurry was then filtered to remove the coated pigment therefrom, and the coated pigment was washed to remove soluble salts therefrom. The resulting filter cake was dried and micronized to yield a coated inorganic oxide pigment in accordance with the present invention.

The properties of the coated pigment, as determined in accordance with the methods described above, are set forth below:

TABLE 4

Titanium Dioxide Base Pigment Including Porous Silica, Dense Silica and Porous Alumina Coatings

| pH | Specific Resistance | Tint Strength | Tint Tone | Ink Stain | Oil Absorption | BET Surface Area (m$^2$/g) |
|---|---|---|---|---|---|---|
| 8.2 | 8,460 | 115 | −3.89 | −6.7 | 42 | 46 |

Thus, the inventive coated inorganic oxide pigment formed in accordance with the inventive method had good optical properties (including tint strength) and tint tone, as well as a nice ink stain value. The results show that the precipitation of a dense coating on the pigment particles helps control the surface area of the particles. The lower surface area of the particles is reflective of a higher bulk density thereof.

Example 4

A coated inorganic oxide pigment comprising a titanium dioxide base pigment, a porous alumina coating deposited on the base pigment, a porous silica coating deposited on the base pigment on top of the porous alumina coating, and a dense alumina coating deposited on the base pigment on top of the porous silica coating was prepared in accordance with the inventive method.

An aqueous slurry comprising the titanium dioxide base pigment was prepared by mixing 800 g the titanium dioxide base pigment with 2100 ml of water. The aqueous slurry was then milled sufficiently to cause 70% of the base titanium dioxide particles in the slurry to have a particle size of less than 0.5 μm. The slurry was then heated to 70° C.

Next, the pH of the slurry was adjusted to a level of from 9 to 10 and allowed to digest for 15 minutes in order to create anchoring sites on the pigment particles to assist in the formation of the inorganic coatings thereon. While maintaining the pH at a level of 9-10, 90 ml of sodium aluminate were added to the slurry, and the resulting slurry was digested for 15 minutes which caused a porous alumina coating to be formed on the titanium dioxide base pigment particles.

The pH of the aqueous slurry was then decreased to a level of 6 to 7. While maintaining the pH of the aqueous slurry at this level, 250 ml of sodium silicate were added to the aqueous slurry which caused a porous silica coating to be deposited on the base pigment on top of the porous alumina coating was that was formed thereon.

Next, the pH of the aqueous slurry was adjusted to a level of 6, and 90 ml of sodium aluminate were added to the slurry to form a dense alumina coating on the titanium dioxide base pigment on top of the porous silica coating that was formed thereon.

Thereafter, the pH of the slurry was adjusted to less than 5 and the slurry was allowed to digest for an additional 15 minutes in order to allow the pH of the slurry to stabilize. The slurry was then filtered to remove the coated pigment therefrom, and the coated pigment was washed to remove soluble salts therefrom. The resulting filter cake was dried and micronized to yield a coated inorganic oxide pigment in accordance with the present invention.

The properties of the coated pigment, as determined in accordance with the methods described above, are set forth below:

TABLE 5

Titanium Dioxide Base Pigment Including Porous Alumina, Porous Silica and Dense Alumina Coatings

| pH | Specific Resistance | Tint Strength | Tint Tone | Ink Stain | Oil Absorption | BET Surface Area (m$^2$/g) |
|---|---|---|---|---|---|---|
| 6.7 | 4,000 | 114 | −3.56 | −8.7 | 38 | 30 |

Thus, the inventive coated inorganic oxide pigment formed in accordance with the inventive method had good optical properties (including tint strength) and a nice ink stain value. The results show that the precipitation of a dense coating on the pigment particles helps control the surface area of the particles. The lower surface area of the particles is reflective of a higher bulk density thereof.

Example 5

A coated inorganic oxide pigment comprising a titanium dioxide base pigment, a dense alumina coating deposited on the base pigment, a porous silica coating deposited on the base pigment on top of the dense alumina coating, a second dense alumina coating deposited on the base pigment on top of the porous silica coating, a dense silica coating deposited on the base pigment on top of the dense alumina coating, and a porous alumina coating deposited on the base pigment on top of the dense silica coating was prepared in accordance with the inventive method.

An aqueous slurry comprising the titanium dioxide base pigment was prepared by mixing 800 g of the titanium dioxide base pigment with 2100 ml of water. The aqueous slurry was then milled sufficiently to cause 70% of the base titanium dioxide particles in the slurry to have a particle size of less than 0.5 microns. The slurry was then heated to 50° C.

The pH of the slurry was then adjusted to 1.5 and the slurry was allowed to digest for 15 minutes in order to create anchoring sites on the pigment particles to assist in the formation of the inorganic coatings thereon.

Thereafter, the pH of the aqueous solution was adjusted to 5.0, and the slurry was allowed to digest for an additional 15 minutes. While maintaining the pH at a level of 5 to 6, 6 ml of sodium aluminate were added to the aqueous slurry and a dense alumina coating was formed on the base pigment particles.

Next, the pH of the aqueous slurry was adjusted to 5.5 and the slurry was allowed to digest for 15 minutes. While maintaining the pH of the slurry at a level of 5.5, 200 ml of sodium silicate were added to the aqueous slurry to form a porous silica coating thereon.

Next, the pH of the aqueous slurry was adjusted to a level of 6 to 7 and the slurry was allowed to digest for 15 minutes. While maintaining the pH of the slurry at a level of 6 to 7, 45 ml of sodium aluminate were added to the aqueous slurry to form a dense alumina coating on the base pigment particles on top of the porous silica coating.

Next, the pH of the aqueous slurry was adjusted to 9 to 10 and the slurry was allowed to digest for 15 minutes. While maintaining the pH of the slurry at a level of 9 to 10, 200 ml of sodium silicate were added to the aqueous slurry to form a dense silica coating on the base pigment particles on top of the dense alumina coating.

Finally, while maintaining the pH of the aqueous slurry at a level of 9 to 10, 39 ml of sodium aluminate were added to the aqueous slurry to form a porous alumina coating on the base pigment particles on top of the dense silica coating thereon.

Thereafter, the pH of the slurry was adjusted to 5 and the slurry was allowed to digest for an additional 15 minutes in order to allow the pH of the slurry to stabilize and to help the coatings cure and stabilize. The slurry was then filtered to remove the coated pigment therefrom, and the coated pigment was washed to remove soluble salts therefrom. The resulting filter cake was dried and micronized to yield a coated inorganic oxide pigment in accordance with the present invention.

The properties of the coated pigment, as determined in accordance with the methods described above, are set forth below:

TABLE 6

Titanium Dioxide Base Pigment Including Dense Alumina, Porous Silica, Dense Alumina, Dense Silica and Porous Alumina Coatings

| pH | Specific Resistance | Tint Strength | Tint Tone | Ink Stain | Oil Absorption | BET Surface Area (m$^2$/g) |
|---|---|---|---|---|---|---|
| 8.6 | 6,000 | 120 | −4.0 | −8.6 | 35 | 30 |

Thus, the inventive coated inorganic oxide pigment formed in accordance with the inventive method had good optical properties, including tint strength and tint tone. The results show that the precipitation of a dense coating on the pigment particles helps control the surface area of the particles. The lower surface area of the particles is reflective of a higher bulk density thereof.

Thus, the present invention is well adapted to carry out the objects and attain the ends and advantages mentioned as well as those which are inherent therein.

What is claimed is:

1. A coated inorganic oxide pigment, comprising:
   an inorganic oxide base pigment;
   a porous inorganic coating formed directly on said base pigment, said porous inorganic coating consisting of silica; and
   a dense inorganic coating formed on said base pigment on top of said porous inorganic silica coating, said dense inorganic coating consisting of alumina.

2. The coated inorganic oxide pigment of claim 1, wherein said inorganic oxide base pigment is a titanium dioxide pigment.

3. The coated inorganic oxide pigment of claim 2, wherein said titanium dioxide pigment is a rutile titanium dioxide pigment produced by the chloride process for manufacturing titanium dioxide.

4. The coated inorganic oxide pigment of claim 1, wherein said porous and dense inorganic coatings are formed on said base pigment in situ in an aqueous slurry at a temperature in the range of from about 40° C. to about 90° C.

5. The coated inorganic oxide pigment of claim 4, wherein said porous and dense inorganic coatings are formed on said base pigment at a temperature in the range of from about 40° C. to about 80° C.

6. The coated inorganic oxide pigment of claim 4, wherein said porous inorganic silica coating is formed on said base pigment at a pH in the range of from about 3 to about 7 and in an amount in the range of from about 5% to about 14% by weight, based on the weight of said base pigment.

7. The coated inorganic oxide pigment of claim 6, wherein said porous inorganic silica coating is formed on said base pigment in an amount in the range of from about 5% to about 10% by weight, based on the weight of said base pigment.

8. The coated inorganic oxide pigment of claim 4, wherein said dense inorganic alumina coating is formed on said base pigment on top of said porous inorganic silica coating at a pH in the range of from about 4 to about 7 and in an amount in the range of from about 2% to about 14% by weight, based on the weight of said base pigment.

9. The coated inorganic oxide pigment of claim 8, wherein said dense inorganic alumina coating is formed on said base pigment in an amount in the range of from about 3% to about 9% by weight, based on the weight of said base pigment.

10. A coated inorganic pigment, comprising:
    an inorganic oxide base pigment;
    a porous inorganic coating formed on said base pigment, said porous inorganic coating consisting essentially of silica and being formed on said base pigment at a pH in the range of from about 3 to about 7 and in an amount in the range of from about 5% to about 14% by weight, based on the weight of said base pigment;
    a dense inorganic coating formed on said base pigment, said dense inorganic coating consisting essentially of alumina and being formed on said base pigment at a pH in the range of about 4 to about 7 and in an amount in the range of from about 2% to about 14% by weight, based on the weight of said base pigment;
    an additional porous inorganic coating that consists essentially of alumina and is formed on said base pigment at a pH in the range of from about 8 to about 11 and in an amount in the range of from about 2% to about 14% by weight, based on the weight of said base pigment, wherein said porous alumina coating is formed directly on said base pigment, said porous silica coating is formed on said base pigment on top of said porous alumina coating, and said dense alumina coating is formed on said base pigment on top of said porous silica coating and wherein said porous and dense inorganic coatings are formed on said base pigment in situ in an aqueous slurry at a temperature in the range of from about 40° C. to about 90° C.

11. A coated inorganic oxide pigment, comprising:
an inorganic base pigment;
a porous inorganic coating formed on said base pigment, said porous inorganic coating consisting essentially of silica being formed on said base pigment at a pH in the range of from about 3 to about 7 and in amount in the range of from about 5% to about 14% by weight, based on the weight of said base pigment; and
a dense inorganic coating formed on said base pigment, said dense inorganic coating consisting essentially of alumina and being formed on said base pigment at a pH in the range of from about 4 to about 7 and in an amount in the range of from about 2% to about 14% by weight, based on the weight of said base pigment;
an additional porous inorganic coating that consists essentially of alumina and is formed on said base pigment at a pH in the range of from about 8 to about 11 and in an amount in the range of from about 2% to about 14% by weight, based on the weight of said base pigment;
an additional dense inorganic coating that consists essentially of alumina and is formed on said base pigment at a pH in the range of from about 4 to about 7 and in an amount in the range of from about 2% to about 14% by weight, based on the weight of said base pigment;
an additional dense inorganic coating that consists essentially of silica and is formed on said base pigment at a pH in the range of from about 8 to about 11 and in an amount in the range of from about 5% to about 14% by weight, based on the weight of said base pigment; and
wherein one of said dense alumina coatings is formed directly on said base pigment, said porous silica coating is formed on said base pigment on top of said dense alumina coating, the other of said dense alumina coatings is formed on said base pigment on top of said porous silica coating, said dense silica coating is formed on said base pigment on top of said dense alumina coating, and said porous alumina coating is formed on said base pigment on top of said dense silica coating and wherein said porous and dense organic coatings are formed on said base pigment in situ in an aqueous slurry at a temperature in the range of from about 40° C. to about 90° C.

12. The coated inorganic oxide pigment of claim 1 wherein said porous inorganic coating and said dense inorganic coating comprise no greater than about 26% by weight, based on the weight of said base pigment.

13. The coated inorganic oxide pigment of claim 12 wherein said porous inorganic coating and said dense inorganic coating comprise in the range of from about 15% by weight to about 18% by weight, based on the weight of said base pigment.

14. A coated inorganic oxide pigment, comprising:
a titanium dioxide base pigment;
a porous inorganic coating formed on said base pigment in situ in an aqueous slurry at a temperature in the range of from about 40° C. to about 90° C., wherein said porous inorganic coating consists of silica is formed on said base pigment at a pH in the range of from about 3 to about 7 and in an amount in the range of from about 5% to about 14% by weight, based on the weight of said base pigment; and
a dense inorganic coating formed on said base pigment in situ in an aqueous slurry at a temperature in the range of from about 40° C. to about 90° C., wherein said dense inorganic coating consists of alumina and is formed on said base pigment at a pH in the range of from about 4 to about 7 and in an amount in the range of from about 2% to about 14% by weight, based on the weight of said base pigment;
an additional porous inorganic coating that consists essentially of alumina and is formed on said base pigment at a pH in the range of from about 8 to about 11 and in an amount in the range of from about 2% to about 10% by weight, based on the weight of said base pigment; and
wherein said porous alumina coating is formed directly on said base pigment, said porous silica coating is formed on said base pigment on top of said porous alumina coating, and said dense alumina coating is formed on said base pigment on top of said porous silica coating.

15. A coated inorganic oxide pigment, comprising:
a titanium dioxide base pigment;
a porous inorganic coating formed on said base pigment in situ in an aqueous slurry at a temperature in the range of from about 40° C. to about 90° C. wherein said porous inorganic coating consists essentially of silica, is formed on said base pigment at a pH in the range of from about 3 to about 7 and in an amount in the range of from about 5% to about 14% by weight, based on the weight of said base pigment; and
a dense inorganic coating formed on said base pigment in situ in an aqueous slurry at a temperature in the range of from about 40° C. to about 90° C., wherein said dense inorganic coating consists essentially of alumina and is formed on said base pigment at a pH in the range of from about 4 to about 7 and in an amount in the range of from about 2% to about 14by weight, based on the weight of said base pigment;
an additional porous inorganic coating that consists essentially of alumina and is formed on said base pigment at a pH in the range of from about 8 to about 11 and in an amount in the range of from about 2% to about 10% by weight, based on the weight of said base pigment;
an additional dense inorganic coating that consists essentially of alumina and is formed on said base pigment at a pH in the range of from about 4 to about 7 and in an amount in the range of from about 3% to about 9% by weight, based on the weight of said base pigment;
an additional dense inorganic coating that consists essentially of silica and is formed on said base pigment at a pH in the range of from about 8 to about 11 and in an amount in the range of from about 5% to about 10% by weight, based on the weight of said base pigment; and
wherein one of said dense alumina coatings is formed directly on said base pigment, said porous silica coating is formed on said base pigment on top of said dense alumina coating, the other of said dense alumina coatings is formed on said base pigment on top of said porous silica coating, said dense silica coating is formed on said base pigment on top of said dense alumina coating, and said porous alumina coating is formed on said base pigment on top of said dense silica coating.

16. The coated inorganic oxide pigment of claim 15 wherein said porous inorganic coatings and said dense inorganic coatings comprise no greater than about 26% by weight based on the weight of said base pigment.

17. The coated inorganic oxide pigment of claim 16 wherein said porous inorganic coatings and said dense inorganic coatings comprise in the range of from about 15% by weight to about 18% by weight, based on the weight of said base pigment.

18. The coated inorganic oxide pigment of claim 1, further comprising:
   an additional porous or dense inorganic coating that consists essentially of a material selected from the group consisting of alumina and silica, said additional coating being formed on said base pigment on top of said dense alumina coating.

19. The coated inorganic oxide pigment of claim 18, wherein said additional porous or dense inorganic coating is a dense inorganic coating.

20. The coated inorganic oxide pigment of claim 18, wherein said additional porous or dense inorganic coating is a porous inorganic coating.

21. The coated inorganic oxide pigment of claim 18, wherein said additional porous or dense inorganic coating consists essentially of alumina.

22. The coated inorganic oxide pigment of claim 18, wherein said additional porous or dense inorganic coating consists essentially of silica.

23. A coated inorganic oxide pigment, comprising:
   a titanium dioxide base pigment;
   a porous inorganic coating formed on said base pigment, said porous inorganic coating consisting essentially of a material selected from the group consisting of alumina and silica;
   a dense inorganic coating formed on said base pigment, said dense inorganic coating consisting essentially of a material selected from the group consisting of silica and alumina; and
   an additional coating formed on said base pigment, said additional coating being a dense, inorganic coating.

24. The coated inorganic oxide pigment of claim 23, wherein said inorganic oxide base pigment is a titanium dioxide pigment.

25. The coated inorganic oxide pigment of claim 23, wherein said additional inorganic, dense coating consists essentially of alumina.

26. The coated inorganic oxide pigment of claim 23, wherein said additional dense inorganic coating consists essentially of silica.

27. A coated inorganic oxide pigment, comprising:
   a titanium dioxide base pigment;
   a porous inorganic coating formed on said base pigment, wherein said porous inorganic coating consists essentially of a material selected from the group consisting of alumina and silica;
   a dense inorganic coating formed on said base pigment, wherein said dense inorganic coating consists essentially of a material selected from the group consisting of silica and alumina; and
   an additional porous or dense inorganic coating consisting of silica, said additional porous or dense inorganic coating being formed on top of said porous inorganic coating and said dense inorganic coating.

28. The coated inorganic oxide pigment of claim 27, wherein said additional inorganic coating is a dense inorganic coating.

29. The coated inorganic oxide pigment of claim 27, wherein said additional inorganic coating is a porous inorganic coating.

30. The coated inorganic oxide pigment of claim 27, wherein said coated inorganic oxide pigment further includes a second additional porous or dense inorganic coating consisting essentially of a material selected from the group consisting of alumina and silica.

31. The coated inorganic oxide pigment of claim 30, wherein said second additional inorganic coating is a dense inorganic coating.

32. The coated inorganic oxide pigment of claim 30, wherein said second additional dense inorganic coating consists of silica.

33. The coated inorganic oxide pigment of claim 27, wherein said porous inorganic coating(s) and said dense inorganic coating(s) comprise no greater than about 26% by weight based on the weight of the base pigment.

* * * * *

UNITED STATES PATENT AND TRADEMARK OFFICE
CERTIFICATE OF CORRECTION

PATENT NO.        : 8,840,719 B2                                           Page 1 of 1
APPLICATION NO.   : 13/044297
DATED             : September 23, 2014
INVENTOR(S)       : Venkata Rama Rao Goparaju and Michael L. Ashley It is certified that error appears in the above-identified patent and that said Letters Patent is hereby corrected as shown below:

In the Claims

In claim 15, column 22, line 38, delete "14by weight" and insert --14% by weight-- therefor.

Signed and Sealed this
Twenty-sixth Day of May, 2015

Michelle K. Lee
*Director of the United States Patent and Trademark Office*